United States Patent
Hazelton et al.

(12)

(10) Patent No.: US 6,203,739 B1
(45) Date of Patent: Mar. 20, 2001

(54) METHOD OF MANUFACTURE OF INSULATION FOR USE IN STATOR SLOT WEDGES

(76) Inventors: Thomas James Hazelton, 7303 Creek Wood Ct.; Mark A. Jeffries, 6883 Cochran Ridge Rd., both of Hiram, GA (US) 30141

( * ) Notice: Subject to any disclaimer, the term of this patent is extended or adjusted under 35 U.S.C. 154(b) by 0 days.

(21) Appl. No.: 09/246,370

(22) Filed: Feb. 8, 1999

Related U.S. Application Data

(62) Division of application No. 08/786,259, filed on Jan. 22, 1997, now Pat. No. 5,989,684.

(51) Int. Cl.[7] .............................. B29C 53/06; B29C 67/00
(52) U.S. Cl. ............................................ 264/163; 264/285
(58) Field of Search ..................................... 264/146, 163, 264/285

(56) References Cited

U.S. PATENT DOCUMENTS 5,552,101 * 9/1996 Fujii et al. ............................ 264/163

* cited by examiner

Primary Examiner—Leo B. Tentoni
(74) Attorney, Agent, or Firm—Kilpatrick Stockton LLP

(57) ABSTRACT

A slitting and scoring machine includes an upper tooling roller and a lower tooling roller that cooperate to define a tooling nip. Each tooling roller includes an alternating series of coaxially arranged annular knives, annular dies, and annular mandrels. A web of insulation is drawn through the tooling nip to simultaneously (i) cut the web into strips, (ii) score the strips in a manner that promotes the forming of the strips, and (iii) partially form the strips into modified U-shapes. Each strip includes a longitudinally extending middle segment and a pair of longitudinally extending side segments that extend away from the middle segment in a divergent manner to define a longitudinally extending channel. Longitudinally extending grooves are formed by the scoring at the junctures of the middle segment and the side segments. The scoring/grooves promote the divergent shape of the strip. In an end profile view of the strip, the middle segment and each of the side segments are generally straight, and an obtuse angle is defined between each side segment and the middle segment. Each strip is formed into a roll, so that a first length of the strip and a second length of the strip each extend around a common point. At least a portion of the second length is disposed within the channel of the first length.

15 Claims, 3 Drawing Sheets ically, such defects result in considerable waste and
METHOD OF MANUFACTURE OF INSULATION FOR USE IN STATOR SLOT WEDGES This invention is a divisional of U.S. application Ser. No. 08/786,259, filed Jan. 22, 1997, now U.S. Pat. No. 5,989,684, which is incorporated herein by reference.

TECHNICAL FIELD

This invention relates to insulation, and more particularly to insulation for stator slots in electric motors and generators.

BACKGROUND OF THE INVENTION

Electric motors and generators have many applications. In a typical motor or generator, there is a rotor that rotates within a stator. The stator includes a plurality of fingers that define rotor slots therebetween. Wires are wound around the fingers and through rotor slots to define coils. Each coil must be insulated for proper operation. Insulation, in the form of slot wedges, is inserted into the stator slots to insulate coils from the stator.

It is common to create slot wedges from a strip of insulation that is unwound from a roll. Rolled strips are typically created by (i) unwinding a web of sheet-like insulation from a roll, (ii) passing the web between rolling scissors/knives to cut the web into strips of insulation, and (iii) rolling the strips into individual rolls. Then, as a separate step, a rolled strip of insulation is supplied to a machine that insulates stators. That machine (i) unwinds the strip from its roll, (ii) cuts the strip into "short" lengths, and (iii) inserts the short lengths into stator slots. The short lengths are inserted prior to the installation of the coils onto the stator. During the process of inserting the short lengths, they become somewhat U-shaped in an end profile view. Examples of machines that insert slot wedges or insulating slot cuffs into stator slots are disclosed in U.S. Pat. Nos. 2,340,291; 3,616,512; 3,831,255; 3,778,889; 3,778,890; 4,831,716; 4,878,292; 4,854,033; and U.S. Pat. No. Re. 34,195.

A common manufacturing defect associated with stators has to do with the insulation of stator slots. If a stator slot is not properly insulated, the coil therein electrically shorts/fails. While prior methods and apparatus for insulating stator slots are generally effective, these type of manufacturing defects still occur, and they typically render motors and generators inoperative. Unfortunately, such defects are often not detected until stators are completely assembled. It is typically cost prohibitive to remanufacture a defective stator; therefore, such defects result in considerable waste and expense. Even worse, such defects are often not detected until after electric motors and generators are placed into service.

Accordingly, there is a need for improved methods, apparatus, and articles of manufacture for forming slot wedges to decrease manufacturing defects in stators.

SUMMARY OF THE INVENTION

This invention solves the above-described problems in the art by providing improved methods, apparatus, and articles of manufacture for forming slot wedges to minimize manufacturing defects in stators. Exemplary embodiments of the present invention simultaneously (i) cut a web of insulation into strips, (ii) score the strips to promote the forming of the strips, and (iii) partially form the strips into modified U-shapes. In accordance with a first exemplary embodiment of the present invention, the scored and partially U-shaped strips are rolled into rolls. In accordance with a second exemplary embodiment of the present invention, the strips are flattened and then rolled into rolls. When the rolls of the strips are supplied to a machine that manufactures stators, remarkable savings are achieved because very few of the fabricated stators have manufacturing defects (i.e., the coils do not electrically short/fail).

In accordance with the exemplary embodiments of the present invention, a slitting and scoring machine includes an upper tooling roller and a lower tooling roller that cooperate to define a tooling nip. Each tooling roller includes an alternating series of coaxially arranged annular knives, annular dies, and annular mandrels. A web of insulation is drawn through the tooling nip where it is formed into a plurality of scored strips. Each strip is longitudinally extending and has opposite longitudinally extending edges. While a strip is within the tooling nip, its edges are at least partially bent toward one another so the piece of insulation defines a longitudinally extending channel.

Subsequent to exiting the tooling nip, each strip is drawn through a drawing nip defined between drawing rollers. In accordance with the first exemplary embodiment, the drawing nip generally maintains the U-shape of the strips. In accordance with the second exemplary embodiment, the drawing nip flattens the strips. Subsequent to exiting the drawing nip, each strip is formed into a roll. In each roll, a first length of the strip and a second length of the strip extend around a common point. In accordance with the first exemplary embodiment, at least a portion of the second length is disposed within the channel of the first length.

More particularly, in accordance with the first exemplary embodiment (prior and subsequent to passing through the drawing nip) and the second exemplary embodiment (prior to being flattened in the drawing nip), each strip includes a longitudinally extending middle segment and a pair of longitudinally extending side segments. The side segments extend away from the middle segment in a divergent manner to define the longitudinally extending channel. Longitudinally extending grooves are defined (i.e., formed by scoring) at the junctures of the middle segment and the side segments. The scoring/grooves promote the divergence of the side segments. In an end profile view of a strip, the middle segment and each of the side segments are generally straight, and an obtuse angle is defined between each side segment and the middle segment.

In accordance with the exemplary embodiments, as the web of insulation passes through the tooling nip, each edge of a strip is cut by a separate pair of meshing annular knives. For each pair of meshing annular knives, one knife belongs to the upper tooling roller and the other knife belongs to the lower tooling roller. Each strip is at least partially shaped in the tooling nip by passing between a die and a mandrel that are between the knives that cut the strip. A pair of annular protrusions on the die score the strip to define the grooves. In addition to participating in the cutting, the annular knives that are opposite from the die bend the edges of the strip around the annular protrusions to form the channel of the strip.

Accordingly, an object of the present invention is to provide improved methods, apparatus, and articles of manufacture for forming slot wedges to minimize manufacturing defects in stators.

Another object of the present invention is to provide a roll of shaped insulation, where each successive layer nests into the prior layer.

Still another object of the present invention is to decrease manufacturing defects in stators.

Still another object of the present invention is to minimize waste and expense associated with manufacturing electric motors and generators.

Other objects, features, and advantages of the present invention will become apparent from the following detailed description, drawings, and claims.

DETAILED DESCRIPTION OF DRAWINGS

As summarized above, the present invention provides improved methods, apparatus, and articles of manufacture for forming slot wedges to minimize manufacturing defects in stators. Exemplary embodiments of this invention are described in detail below, with reference to drawings in which like numbers reference like parts throughout the several views.

Figure 1:
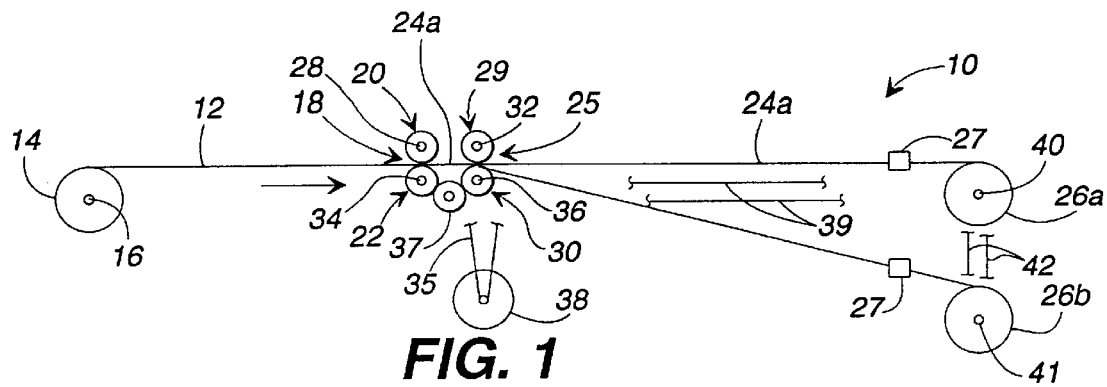
FIG. 1 is a schematic side view of a slitting and forming machine in accordance with exemplary embodiments of the present invention.
Figure 2:
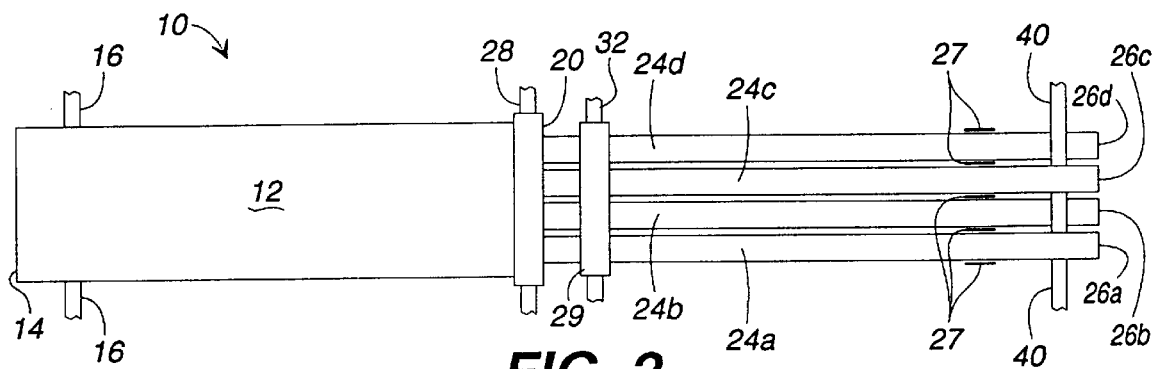
FIG. 2 is a schematic top view of portions of the machine of FIG. 1.

Turning now to the drawings, FIGS. 1 and 2 are schematic side and top views, respectively, of a slitting and forming machine 10 in accordance with the exemplary embodiments of the present invention. A generally planar web 12 of insulation is drawn from a roll 14 that rotates about a shaft 16. The web 12 is drawn through a tooling nip 18 defined between an upper rotation assembly (e.g., upper tooling roller 20) and a lower rotation assembly (e.g., lower tooling roller 22). The tooling rollers 20, 22 contemporaneously cut the web 12 into strips 24a–d, score the strips 24a–d, and bend the edges of the strips 24a–d so that they are generally U-shaped, as discussed in greater detail below.

Subsequent to exiting the tooling nip 18, each strip 24a–d is drawn through a drawing nip 25 defined between an upper drawing roller 29 and a lower drawing roller 30. In accordance with a first exemplary embodiment, each of the drawing rollers 29, 30 has a flexible, somewhat soft cylindrical surface formed of a material such as, but not limited to, neoprene; the flexible somewhat soft surfaces of the drawing rollers 29, 30 function to grip the strips 24a–d but do not substantially flatten the strips 24a–d. In accordance with a second exemplary embodiment, each of the drawing rollers 29, 30 has a more rigid cylindrical surface formed of a material such as, but not limited to, steel or chrome; the rigid surfaces of the drawing rollers 29, 30 function to grip and flatten the strips 24a–d.

Subsequent to exiting the drawing nip 25, the strips 24a–d are wound into strip rolls 26a–d, respectively. Conventional guide plates 27 guide the strips 24a–d to aid in the formation of the strip rolls 26a–d. The strip rolls 26a, 24c encircle a driven shaft 40 and the strip rolls 26b, 26d encircle a driven shaft 41. From the perspective of FIG. 1, the strip rolls 26a–d rotate clockwise. This rotation of the strip rolls 26a–d draws the strips 24a–d from the drawing nip 25.

The upper tooling roller 20 and lower tooling roller 22 include and are driven by a shafts 28, 34, respectively. The upper drawing roller 29 and the lower drawing roller 30 include and are 30 driven by shafts 32, 36, respectively. From the perspective of FIG. 1, the upper tooling roller 20 and the upper drawing roller 29 rotate counterclockwise. From the perspective of FIG. 1, the lower tooling roller 22 and the lower drawing roller 36 rotate clockwise. The rotation of the rollers 20, 22, 29, 30 unwinds the web 12 from the roll 14 and draws the web 12 through the nips 18, 25.

The shafts 28, 32, 34, 36, 40, 41 are driven by the output shaft of a motor 38, in a conventional manner. An endless drive element, such as a drive belt 35, which is partially cut-away in FIG. 1, extends between the output shaft of the motor 38 and a pulley (not shown) carried by the shaft 36 to drive the lower drawing roller 30. A gear (not shown) carried by the shaft 36 meshes with a gear (not shown) carried by the shaft 32 to drive the upper drawing roller 29. A gear (not shown) carried by the shaft 34 meshes with an idler gear 37 and the gear (not shown) carried by the shaft 36 to drive the lower tooling roller 22. A gear (not shown) carried by the shaft 28 meshes with the gear (not shown) carried by the shaft 34 to drive the upper tooling roller 20. An endless drive element, such as a drive chain 39, which is partially cut-away in FIG. 1, extends between a sprocket (not shown) carried by the shaft 36 and a sprocket (not shown) carried by the shaft 40 to drive the strip rolls 26a, 26c. An endless drive element, such as a drive chain 42, which is partially cut-away in FIG. 1, extends between a sprocket (not shown) carried by the shaft 40 and a sprocket (not shown) carried by the shaft 41 to drive the strip rolls 26b, 26d.

The slitting and forming machine 10 includes a conventional mechanism (not shown) for separating the tooling rollers 20, 22 and the drawing rollers 29, 30 to widen the tooling nip 18 and the drawing nip 25, respectively. This facilitates the initial insertion of the web 12 into the tooling nip 18 and drawing nip 25. The same mechanism also forces the tooling rollers 20, 22 toward one another into a meshed configuration that is operative to form the strips 24a–d from the web 12.

Figure 4:
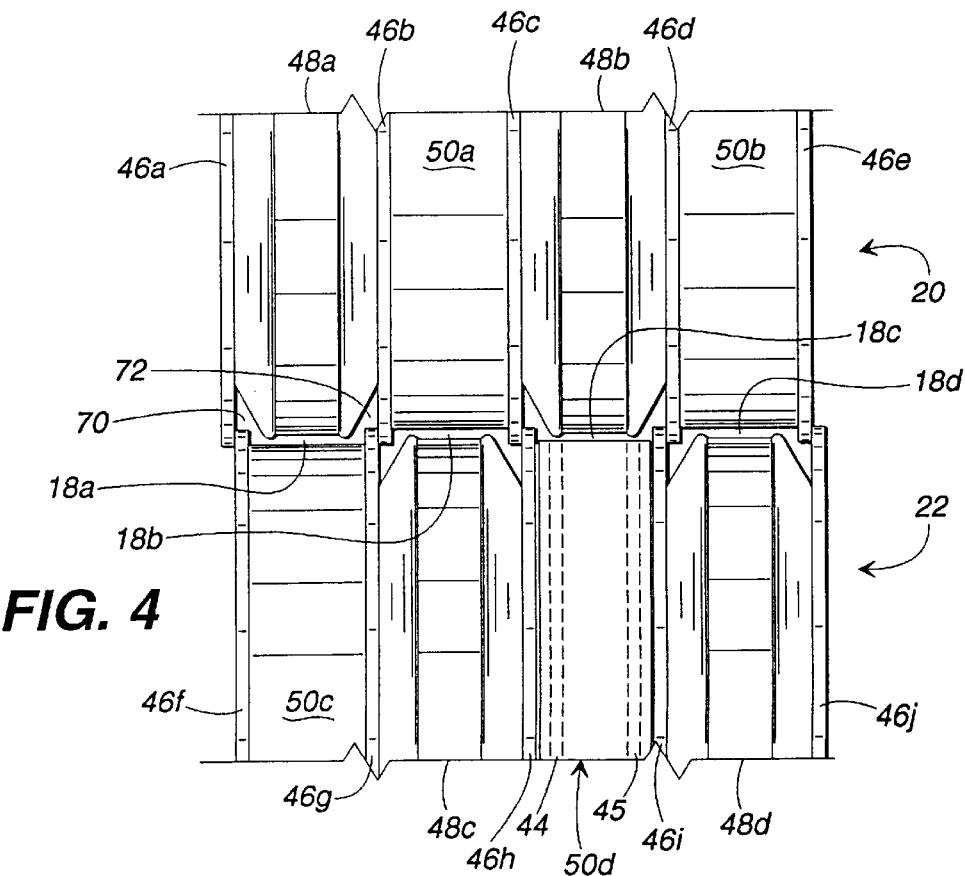
FIG. 4 is a partially cut-away, elevational view of portions of the upper and lower rotation assemblies of FIG. 3.
Figure 3:
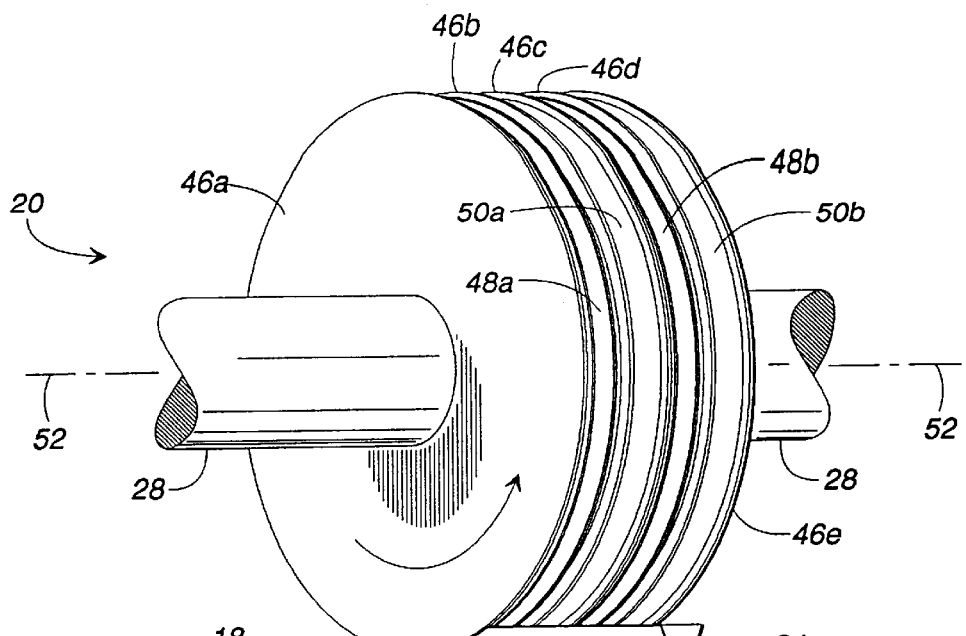
FIG. 3 is a partially cut-away, pictorial view of upper and lower rotation assemblies of the machine of FIG. 1, with a strip of insulation extending from the tooling nip.

FIG. 3 is a partially cut-away, pictorial view of the upper and lower tooling rollers 20, 22 with a single strip 24a extending from the tooling nip 18 for illustrative purposes. FIG. 4 is a partially cutaway, elevational view of portions of the upper and lower tooling rollers 20, 22. The upper tooling roller 20 includes annular knives 46a–e, annular dies 48a–b, and annular mandrels 50a–b, all of which define axially extending central bores through which the shaft 28 is press-fit. The knives 46a–e, dies 48a–b, and mandrels 50a–b are fixed to the shaft 28 and rotate coaxially therewith about the axis 52. Similarly, the lower tooling roller 22 includes annular knives 46f–j, annular dies 48c–d, and annular mandrels 50c–d, all of which define axially extending central bores through which the shaft 34 is press-fit. The knives 46f–j, dies 48c–d, and mandrels 50c–d are fixed to the shaft 34 and rotate coaxially therewith about the axis 54.

Each of the knives 46a–j is identically constructed. Each knife 46 is a right circular cylinder having a diameter of approximately 3.250 inches, an axial length of approximately 0.025 inches, and a centered axially extending bore for receiving one of the shafts 28, 34, as discussed above. Each of the mandrels 50a–d is identically constructed. Each mandrel 50 is a right circular cylinder having a diameter of approximately 3.200 inches, an axial length of approximately 0.211 inches, and a centered axially extending bore for receiving one of the shafts 28, 34, as discussed above.

Figure 5:
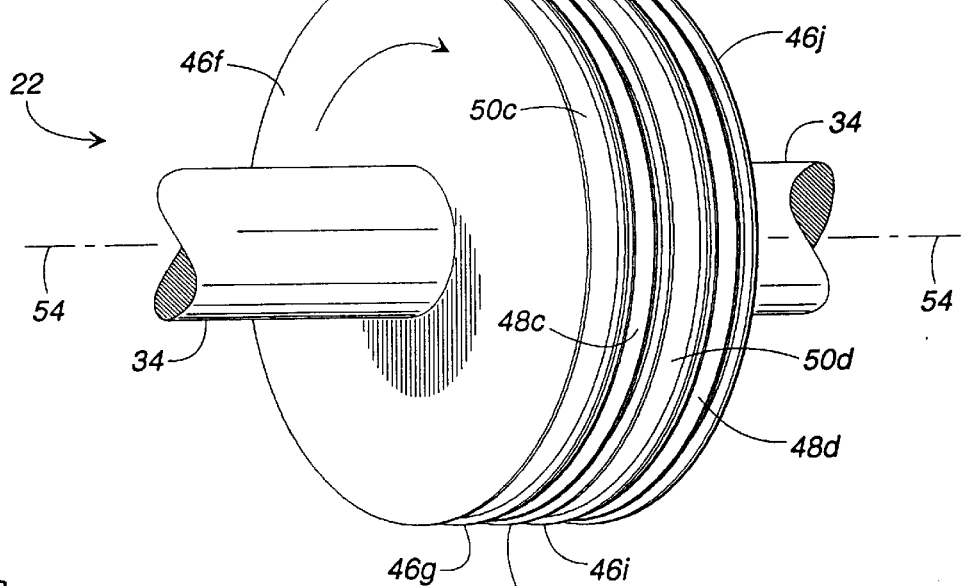
FIG. 5 is an isolated, partially cut-away, elevational view of a die of the rotation assemblies of FIG. 3.
Figure 5:
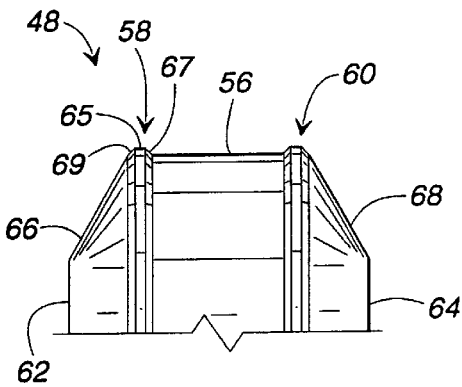

Each of the dies 48a–d is identically constructed. FIG. 5 is an isolated, partially cut-away, elevational view of a die 48. Each die 48 is uniform around its periphery. Each die 48 includes an annular central surface 56 that is in the form of a right circular cylinder that is coaxial with the axis of the die 48. The central surface 56 has a diameter of approximately 3.200 inches and an axial length of approximately 0.1140 inches. Each die 48 includes a first annular protrusion 58 at one side of the central surface 56 and a second annular protrusion 60 at the opposite side of the central surface 56. A channel surface 66 extends between the first protrusion 58 and a side surface 62. Likewise, channel surface 68 extends between the second protrusion 60 and a side surface 64. Each annular protrusion 58, 60 is generally identical, each side surface 62, 64 is generally identical, and each channel surface 66, 68 is generally identical; therefore a discussion of one should be understood to refer to the other.

The first annular protrusion 58 is coaxial with the axis of the die 48 and includes an annular cylindrical surface 65 at its apex.

The cylindrical surface 65 is coaxial with the axis of the die 48 and has a diameter of approximately 3.2 inches and an axial length of approximately 0.01 inches. The first annular protrusion 58 further includes a first sloping surface 67 that is coaxial with the axis of the die 48. The first sloping surface 67 extends from an edge of the annular cylindrical surface 65 to the edge of the central surface 56 at an angle of approximately 45 degrees relative to the cylindrical surface 65. The first annular protrusion 58 further includes a second sloping surface 69 that is coaxial with the axis of the die 48. The second sloping surface 69 extends from an edge of the cylindrical surface 65 to the upper edge of the channel surface 66 at an angle of approximately 45 degrees relative to the cylindrical surface 65. Each of the sloping surfaces 67, 69 extend approximately 0.005 inches in the axial direction. The side surface 62 is planar and perpendicular to the axis of the die 48. The channel surface 66 slopes upward from the side surface 62 at an angle of approximately 30 degrees relative to the side surface 62 (i.e., relative to a vertical reference). The axial distance between the side surfaces 62, 64 is approximately 0.2613 inches. Each die 48 defines a centered, axially extending bore for receiving one of the shafts 28, 34 (FIGS. 1 and 3), as discussed above.

In accordance with the exemplary embodiments of the present invention, the tooling rollers 20, 22 are meshed in the manner depicted in FIG. 4 when the slitting and forming machine 10 (FIGS. 1 and 2) is forming the web 12 (FIGS. 1 and 2) into strips 24a–d (FIGS. 13). In the upper tooling roller 20, the knife 46a abuts the die 48a, which abuts the knife 46b, which abuts the mandrel 50a, which abuts the knife 46c, which abuts the die 48b, which abuts the knife 46d, which abuts the mandrel 50b, which abuts the knife 46e. Stated differently, the knives 46a, 46b sandwich the die 48a; the knives 46b, 46c sandwich the mandrel 50a; the knives 46c, 46d sandwich the die 48b; and the knives 46d, 46e sandwich the mandrel 50b.

In the lower tooling roller 22, the knife 46f abuts the mandrel 50c, which abuts the knife 46g, which abuts the die 48c, which abuts the knife 46h, which abuts the mandrel 50d, which abuts the knife 46i, which abuts the die 48d, which abuts the knife 46j. Stated differently, the knives 46f, 46g sandwich the mandrel 50c; the knives 46g, 46h sandwich the die 48c; the knives 46h, 46i sandwich the mandrel 50d; and the knives 46i, 46j sandwich the die 48d.

Regarding the tooling rollers 20, 22 together, the peripheries of the knives 46a, 46f overlap so that sides of those knives 46a, 46f are in contact. The peripheries of the knives 46b, 46g overlap so that sides of those knives 46b, 46g are in contact. The peripheries of the knives 46c, 46h overlap so that sides of those knives 46c, 46h are in contact. The peripheries of the knives 46d, 46i overlap so that sides of those knives 46d, 46i are in contact. And, the peripheries of the knives 46e, 46j overlap so that sides of those knives 46e, 46j are in contact. The die 48a is above and faces the mandrel 50c. The die 48b is above and faces the mandrel 50d. The die 48c is below and faces the mandrel 50a. And, the die 48d is below and faces the mandrel 50b.

The relationship between the knives 46 associated with each facing die 48 and mandrel 50 pair is the same, so a discussion of the interaction between the knives 46a, 46b, 46f, 46g associated with the die 48a and the mandrel 50c should be understood to be representative. The knife 46a has an inner side that is contacting the die 48a and an outer side that is opposite from the die 48a. Similarly, the knife 46b has an inner side that is contacting the die 48a and an outer side that is opposite from the die 48a. The knife 46f has an inner side contacting the mandrel 50c and an outer side that is opposite from the mandrel 50c. Similarly, the knife 46g has an inner side that is contact the mandrel 50c and an opposite outer side that is opposite from the mandrel 50c. The knives 46a, 46f overlap such that the inner side of the knife 46a contacts the outer side of the knife 46f. Similarly, the knives 46b, 46g overlap such that the inner side of the knife 46b contacts the outer side of the knife 46g.

As described above and depicted in FIG. 4, the meshing of the tooling rollers 20, 22 segments the tooling nip 18 into generally identical tooling nip sections 18a–d, within which the strips 24a–d are formed, respectively. Due to the similarity between tooling nip sections 18a–d, the following discussion of tooling nip section 18a should be understood to be representative of the other tooling nip sections 18b–d. In the tooling nip section 18a, the distance between the central surface 56 (FIG. 5) of the die 48a and the peripheral surface of the mandrel 50c is approximately 0.015 inches, which approximately corresponds to the thickness of the web 12 (FIG. 1). The tooling nip section 18a includes a channel 70 defined between the knife 46a and the channel surface 66 (FIG. 5) of the die 48a. The tooling nip section 18a also includes a channel 72 defined between the knife 46b and the channel surface 68 of the die 48a.

As the web 12 (FIGS. 1 and 2) passes through the tooling nip section 18a, the interaction between the knives 46a, 46f cut one side of the strip 26a (FIGS. 1–3), and the interaction between the knives 46b, 46g cut the other side of the strip 26a. Simultaneously with the cutting, the protrusions 58, 60 (FIG. 5) of the die 48a score the strip 26a, and the periphery of the knives 46f, 46g and the mandrel 50c force the strip 26a against the surfaces of the die 48a that are exposed within the tooling nip section 18a. Therefore, the strip 26a takes on the shape of the surfaces of the die 48a that are exposed within the tooling nip section 18a. While the slitting and forming machine 10 (FIGS. 1 and 2) is characterized herein as including only four tooling nip sections 18a–d and creating only four strips 24a–d (FIG. 1), it is preferable for the machine 10 to include additional tooling nip sections and accommodate for additional strips, in a manner that would be understood by those skilled in the art upon understanding this disclosure.

Referring to FIG. 4, in accordance with an alternative embodiment of the present invention, the surface of each of the mandrels 50a–d is modified to include a pair of annular grooves that are for receiving the pair of protrusions 60 on the dies 48a–d, respectively. As a representative example, a pair of annular grooves 44, 45 are depicted in broken lines on the mandrel 50d in FIG. 4. Having the protrusions 60 protrude into the grooves 44, 45 aids in the formation of strips 26, especially when the strips 24a–d are a material that is relatively hard to form.

Figure 6:
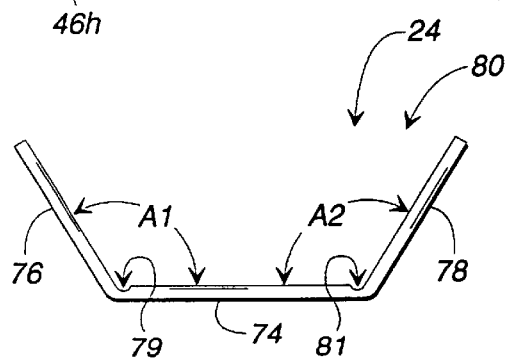
FIG. 6 is an isolated, end profile view of the strip of insulation of FIG. 3.
Figure 7:
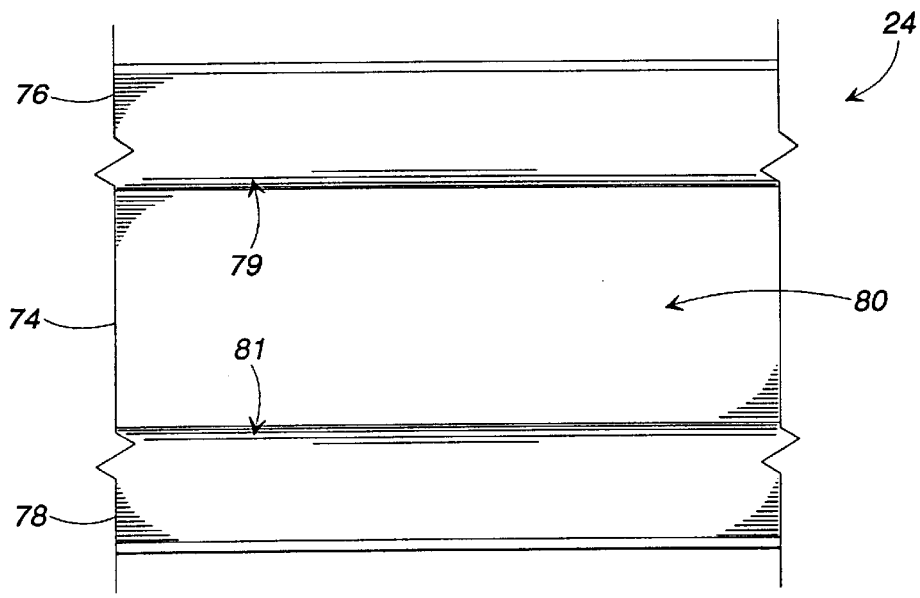
FIG. 7 is an isolated, partially cut-away, top plan view of the strip of insulation of FIG. 3.

Each of the strips 24a–d (FIG. 2) are generally identical. FIG. 6 is an isolated, end profile view, and FIG. 7 is an isolated, partially cut-away, top plan view of a strip 24 subsequent to exiting the tooling nip 18 (FIG. 1) and prior to entering the drawing nip 25 (FIG. 1). The strip 24 includes a longitudinally extending middle segment 74 and longitudinally extending side segments 76, 78 that extend upward from the middle segment 74 in a divergent manner. Angles "A1" and "A2" are defined between the middle segment 74 and the side segments 76, 78, respectively. The angles "A1" and "A2" are preferably oblique for a strip 24 that has exited the tooling nip 18 (FIG. 1) and has not yet entered the drawing nip 18.

As depicted in FIGS. 6 and 7, the internal surfaces of the segments 74, 76, 78 cooperate to define a longitudinally extending channel 80. The external surfaces of the segments 74, 76, 78 are opposite from the channel 80. The strip 24 defines longitudinally extending grooves 79, 81 formed by the scoring action of protrusions 58, 60 (FIG. 5), respectively. The first groove 79 is collinear with the juncture of the segments 74, 76, and the second groove 81 is collinear with the juncture of the segments 74,78. Each groove 79, 81 can be characterized as including a plurality of indentations that are so numerous and proximate that a generally continuous and uniform groove is defined. The strip 24 is continuous, generally uniform along its length, and unitary (meaning that it is absent of separate but joinable parts).

In accordance with the exemplary embodiments of the present invention, subsequent to exiting the drawing nip 18 (FIG. 1), the angles "A1" and "A2" each acceptably range from between approximately 95 degrees to 180 degrees. For a given strip 24, each of the angles "A1" and "A2" are preferably approximately identical. In accordance with the first exemplary embodiment, where each of the drawing rollers 29, 30 (FIG. 1) preferably has a flexible, somewhat soft surface, the drawing nip 25 (FIG. 1) generally does not change the shape of the strips 24 passing therethrough. That is, the angles "A1" and "A2" of a strip 24 passing through the drawing nip 25 are substantially unchanged, in accordance with the first exemplary embodiment.

In accordance with the second exemplary embodiment, where each of the drawing rollers 29, 30 (FIG. 1) preferably has a surface that is more rigid than in the first exemplary embodiment, the drawing nip 25 (FIG. 1) does change the shape of the strips 24 passing therethrough. That is, in accordance with the second exemplary embodiment, the strips 24 are at least partially flattened (i.e., the angles "A1" and "A2" are increased) as they pass through the drawing nip 25. For example, in accordance with the second exemplary embodiment, the angles "A1" and "A2" can be 180 degrees. When the hardness of the surfaces of the drawing rollers 29, 30 is increased, the strips 24 become flatter, and when the hardness of the surfaces of the drawing rollers 29, 30 is decreased, the flattening of the strips 24 decreases.

Figure 8:
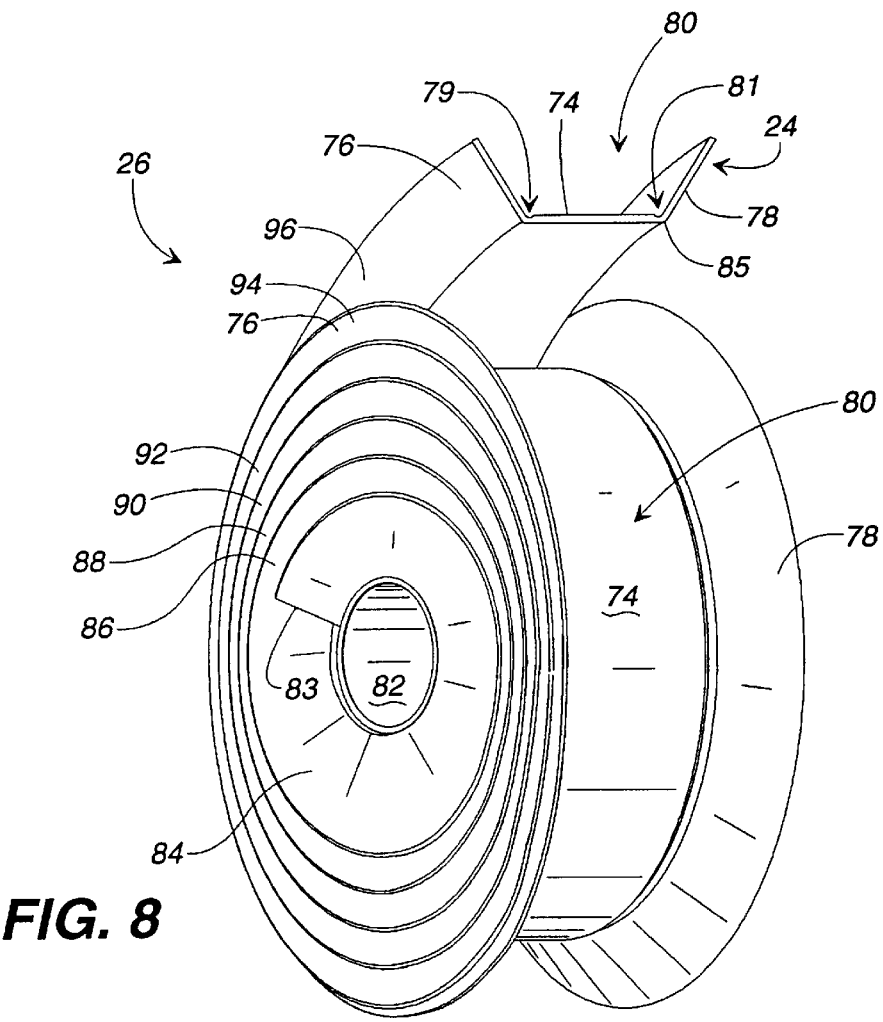
FIG. 8 is a pictorial view of a strip of insulation formed into a roll, in accordance with a first exemplary embodiment of the present invention.

In accordance with the first exemplary embodiment, the strip rolls 26a–d (FIG. 2) are generally identical. FIG. 8 is a pictorial view of a strip 24 formed into a roll 26, in accordance with the first exemplary embodiment. The strip 24 depicted in FIG. 8 is continuous (i.e., unbroken) intermediate of its ends 83, 85. The strip 24 includes lengths 84, 86, 88, 90, 92, 94, 96 which are generally concentric and extend around a central point (i.e., a point on the axis of the tube 82) for approximately 360 degrees. The outer surface of the middle segment 74 of the first length 84 abuts the outer surface of the tube 82 for approximately 360 degrees. The outer surface of the middle segment 74 of the second length 86 abuts the inner surface of the middle segment 74 of the first length 84 for approximately 360 degrees. A substantial portion of the outer surfaces of the side segments 76, 78 of the second length 86 abut the inner surfaces of the side segments 76, 78, respectively, of the first length 84 for approximately 360 degrees. Therefore, a substantial portion of the second length 76 is within the channel 80 of the first length 84 for approximately 360 degrees. Each successive length of the strip 24 similarly nests into the channel 80 of the prior length of the strip 24.

In accordance with the second exemplary embodiment, the strip rolls 26a–d (FIG. 2) are also generally identical. In accordance with the second exemplary embodiment, a roll 26 would be identical to that which is depicted in FIG. 8, except that the angles "A1" and "A2" (FIG. 6) would be greater than that which is depicted in FIG. 8. For example, in accordance with one acceptable example of the second exemplary embodiment, the angles "A1" and "A2" can be 180 degrees, such that a roll includes a continuous flat strip 24 wrapped generally concentrically around a central point (i.e., a point on the axis of a tube 82). In summary, in accordance with the exemplary embodiments of the present invention, for a roll 26, each of the angles "A1" and "A2" (FIG. 6) are preferably approximately identical and acceptably range from between approximately 95 degrees to 180 degrees.

In accordance with the exemplary embodiments, the web 12 (and therefore the strips 24a–d) is preferably insulation such as: high temperature aramid paper, such as that sold under the trademark "NOMEX"; hard vulcanized fiber; "MYLAR"; polyester fiber paper saturated with a heat resistant epoxy resin, such as that sold under the trademark "DUROID"; or laminate of "DACRON" and polyester film. These insulations are available from Fabrico, a division of Electrical Insulation Suppliers, Inc., which has facilities, for example, in Atlanta, Ga.; Mequon, Wis.; and Rancho Cucamonga, Calif.

In accordance with one acceptable example, subsequent to passing through the drawing nip 25 (FIG. 1) a strip 24 of vulcanized fiber has angles "A1" and "A2" (FIG. 6) which are each approximately identical and approximately 168 degrees to 165 degrees. In accordance with another acceptable example, subsequent to passing through the drawing nip 25 (FIG. 1) a strip 24 in the form of a layer of "MYLAR" sandwiched (e.g., laminated) between an upper layer of "DACRON" and a lower layer of "DACRON" has angles "A1" and "A2" (FIG. 6) which are each approximately identical and approximately 175 degrees to 174 degrees.

Referring to FIGS. 1 and 6, in accordance with the exemplary embodiments, when all other variables are held constant, the angles "A1" and "A2" can be varied by varying the material of the web 12 (and therefore the strips 24a–d). For example, when the strips 24a–d are a material that is relatively harder to form (e.g., a "DACRON" /"MYLAR" /"DACRON" laminate) the angles "A1" and "A2" angle will be greater than when the strips 24a–d are a material that is relatively easier to form (e.g., a paper that is not laminated). Other examples of means for varying the angles "A1" and "A2" are outlined below.

Referring to FIGS. 1, 5, and 6, in accordance with the exemplary embodiments, when all other variables are held constant, the angles "A1" and "A2" can also be varied by varying the angle that channel surface 66 slopes upward from the side surface 62. As depicted in FIG. 5, this angle (i.e., the angle of the channel surface 66) is approximately 30 degrees relative to the side surface 62 (i.e., relative to a vertical reference). Increasing the angle of the channel surface 66 tends to increase the angles "A1" and "A2", while decreasing the angle of the channel surface 66 tends to decrease the angles "A1" and "A2".

Referring to FIGS. 1, 4, and 6, in accordance with the exemplary embodiments, when all other variables are held constant, the angles "A1" and "A2" can also be varied by varying the shape of the knives 46. For example, increasing the diameter of the knives 46 tends to decrease the angles "A1" and "A2", while decreasing the diameter of the knives 46 tends to increase the angles "A1" and "A2". Similarly, increasing and decreasing the width (i.e., axial length) of the knives 46 will decrease and increase, respectively, the angles "A1" and "A2".

It should be understood that, throughout this disclosure, unless indicated otherwise, details provided apply to both the first exemplary embodiment and the second exemplary embodiment. Also, the second exemplary embodiment is generally identical to the first exemplary embodiment, unless indicated otherwise. It should also be understood that the foregoing relates to particular embodiments of the present invention, and that numerous changes may be made therein without departing from the scope of the invention as defined by the following claims.

We claim:

1. A method of forming insulation, comprising the steps of:
    shaping a longitudinally extending strip having opposite longitudinally extending edges, comprising the steps of
        bending the edges toward one another so that the strip defines a longitudinally extending channel, and
        scoring the strip in a manner that promotes the bending step, wherein the scoring step and the bending step are contemporaneous.

2. The method of claim 1, wherein the shaping step further comprising the step of slitting a web to form the strip, wherein the steps of slitting, bending, and scoring are contemporaneous.

3. The method of claim 2, further comprising the steps of:
    unrolling the web from a roll;
    drawing the web through a nip, wherein the shaping step is carried out in the nip; and
    forming the strip into a roll such that a first length of the strip and a second length of the strip each extend around a common point and at least a portion of the second length is disposed within a channel of the first length.

4. The method of claim 3, wherein the nip is defined between a pair of meshing rotation assemblies, each rotation assembly comprising an alternating series of coaxially arranged annular knives, annular dies, and annular mandrels.

5. The method of claim 1,
    wherein the bending step comprises the steps of
        forming a longitudinally extending first juncture between a longitudinally extending first side segment of the strip and a longitudinally extending middle segment of the strip, and
        forming a longitudinally extending second juncture between the middle segment and a longitudinally extending second side segment of the strip, and
    wherein the scoring step comprises the steps of
        forming a first plurality of indentations extending longitudinally and proximate to the first juncture, and
        forming a second plurality of indentations extending longitudinally and proximate to the second juncture.

6. The method of claim 5,
    wherein the first plurality of indentations are closely arranged such that the piece of insulation defines a first longitudinally extending groove that is generally collinear with the first juncture, and
    wherein the second plurality of indentations are closely arranged such that the piece of insulation defines a second longitudinally extending groove that is generally collinear with the second juncture.

7. The method of claim 1,
    wherein the shaping step is a first shaping step, and
    wherein the method further comprises a second shaping step comprising a step of at least partially flattening the strip.

8. A method of transforming a web of insulation, comprising the steps of:
    forming a strip, comprising the steps of
        slitting the web to form a longitudinally extending strip having opposite longitudinally extending edges, and
        bending the edges toward one another such that the strip defines a longitudinally extending channel,
    wherein the slitting step and the bending step are contemporaneous.

9. The method of claim 8, further comprising the step of contemporaneously creating a plurality of strips from the web by performing the forming step for each strip of the plurality of strips.

10. The method of claim 8, further comprising the steps of:
    unrolling the web from a roll;
    drawing the web through a nip, wherein the forming step is carried out in the nip; and
    forming the strip into a roll such that a first length of the strip and a second length of the strip each extend around a common point and at least a portion of the second length is disposed within a channel of the first length.

11. The method of claim 10, wherein the nip is defined between a pair of meshing rotation assemblies, each rotation assembly comprising an alternating series of coaxially arranged annular knives, annular dies, and annular mandrels.

12. The method of claim 8, wherein the forming step further comprising the step of scoring the strip in a manner that promotes the bending step.

13. The method of claim 12,
    wherein the bending step comprises the steps of
        forming a longitudinally extending first juncture between a longitudinally extending first side segment of the strip and a longitudinally extending middle segment of the strip, and
        forming a longitudinally extending second juncture between the middle segment and a longitudinally extending second side segment of the strip, and wherein the scoring step comprises the steps of
forming a first plurality of indentations extending longitudinally and proximate to the first juncture, and
forming a second plurality of indentations extending longitudinally and proximate to the second juncture.

14. The method of claim 13,
wherein the first plurality of indentations are closely arranged such that the piece of insulation defines a first longitudinally extending groove that is generally collinear with the first juncture, and
wherein the first plurality of indentations are closely arranged such that the piece of insulation defines a first longitudinally extending groove that is generally collinear with the first juncture.

15. The method of claim 8, further comprising a step of at least partially flattening the strip subsequent to the forming step.

* * * * *